United States Patent
Koizumi et al.

(10) Patent No.: US 9,535,431 B2
(45) Date of Patent: Jan. 3, 2017

(54) AIR-CONDITIONING SYSTEM AND AIR-CONDITIONING METHOD

(75) Inventors: Yoshiaki Koizumi, Tokyo (JP); Naoyuki Hibara, Tokyo (JP); Noriyuki Kushiro, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 847 days.

(21) Appl. No.: 13/978,929

(22) PCT Filed: Jan. 28, 2011

(86) PCT No.: PCT/JP2011/051828
§ 371 (c)(1),
(2), (4) Date: Jul. 10, 2013

(87) PCT Pub. No.: WO2012/101831
PCT Pub. Date: Aug. 2, 2012

(65) Prior Publication Data
US 2013/0289777 A1    Oct. 31, 2013

(51) Int. Cl.
*G05D 23/19* (2006.01)
*F24F 11/00* (2006.01)

(52) U.S. Cl.
CPC ............. *G05D 23/19* (2013.01); *F24F 11/006* (2013.01); *F24F 2011/0068* (2013.01)

(58) Field of Classification Search
None
See application file for complete search history.

(56) References Cited

U.S. PATENT DOCUMENTS 5,176,006 A * 1/1993 Ikawa ............... F24F 11/00
                                                    165/265
5,353,862 A * 10/1994 Akiyama ............... F24F 3/14
                                                    165/229

(Continued)

FOREIGN PATENT DOCUMENTS

JP  06-058597 A   3/1994
JP  06-337154 A   12/1994

(Continued)

OTHER PUBLICATIONS

International Search Report of the International Searching Authority mailed Mar. 1, 2011 for the corresponding international application No. PCT/JP2011/051828 (with English translation).

*Primary Examiner* — Van Nguyen
(74) *Attorney, Agent, or Firm* — Posz Law Group, PLC

(57) ABSTRACT

An air-conditioning system comprises portable devices including measurement units that measure temperature or humidity. In addition, the air-conditioning system comprises a transmitter mounted in indoor equipment that transmits light or electromagnetic waves to the portable devices, and a receiver mounted in the indoor equipment that receives detected intensity information expressing the intensity of the light or the electromagnetic waves detected by the portable devices. Furthermore, the air-conditioning system comprises a detector that detects the distance from the indoor equipment to the portable devices based on the detected intensity expressed by the detected intensity information, and a controller that controls the air-blowing state of the indoor equipment based on the detected distances and the measured temperature or humidity. Thus, the temperature or the humidity at a specified location can be adjusted more accurately.

15 Claims, 20 Drawing Sheets

(56) References Cited

U.S. PATENT DOCUMENTS

| | | | | |
|---|---|---|---|---|
| 5,921,099 | A * | 7/1999 | Lee | F24F 11/006 236/78 D |
| 6,002,987 | A * | 12/1999 | Kamiya | G03F 7/709 250/492.2 |
| 6,175,772 | B1 * | 1/2001 | Kamiya | F24F 11/006 700/31 |
| 6,334,317 | B1 * | 1/2002 | Bougauchi | F24F 11/0086 236/51 |
| 6,603,865 | B1 | 8/2003 | Yagi et al. | |
| 6,978,627 | B2 * | 12/2005 | Masui | F24F 11/006 236/51 |
| 7,523,872 | B2 * | 4/2009 | Masui | F24F 11/006 236/94 |
| 8,036,778 | B2 * | 10/2011 | Masuda | F24F 11/0034 165/208 |
| 8,220,278 | B2 * | 7/2012 | Han | F24F 11/0012 165/237 |
| 8,323,081 | B2 * | 12/2012 | Koizumi | G01S 5/14 236/49.3 |
| 8,392,026 | B2 * | 3/2013 | Matsumoto | F24F 11/0034 454/256 |
| 8,416,101 | B2 * | 4/2013 | Lee | A61M 21/00 340/540 |
| 8,809,789 | B2 * | 8/2014 | Matsumoto | F24F 1/0007 250/353 |
| 8,826,678 | B2 * | 9/2014 | Nakagawa | F24F 11/0012 236/49.3 |
| 9,021,822 | B2 * | 5/2015 | Unagida | F24F 11/0079 62/177 |

FOREIGN PATENT DOCUMENTS

| | | |
|---|---|---|
| JP | 2921256 B2 | 4/1999 |
| JP | 2001-025064 A | 1/2001 |
| JP | 2001-197577 A | 7/2001 |
| JP | 2001-208511 A | 8/2001 |
| JP | 2001-349742 A | 12/2001 |
| JP | 2007-127348 A | 5/2007 |
| JP | 4042480 B2 | 11/2007 |
| JP | 2008-241185 A | 10/2008 |
| JP | 2008-309379 A | 12/2008 |

* cited by examiner

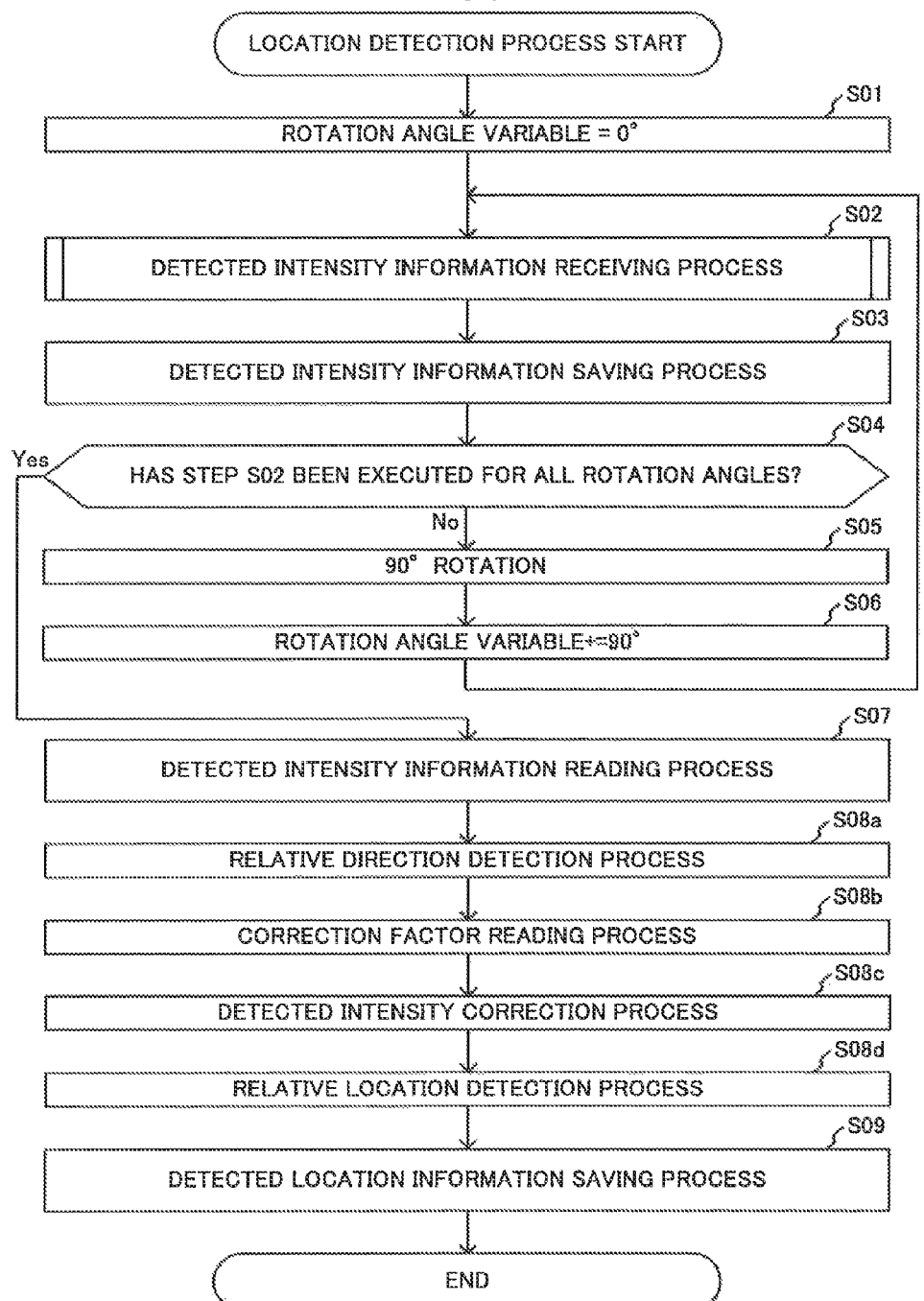

FIG.8

DETECTED INTENSITY TABLE

| ANGLE | ID | | | | | | | |
|---|---|---|---|---|---|---|---|---|
| | 1 | 2 | 3 | 4 | 5 | 6 | 7 | 8 |
| 0 | 2.0 | — | — | — | 0.5 | — | — | — |
| 90 | — | — | — | 2.5 | — | — | — | 1.0 |
| 180 | — | — | 2.3 | — | — | — | 0.5 | — |
| 270 | — | 2.6 | — | — | 0.4 | 1.1 | 0.4 | — |
| ... | ... | ... | ... | ... | ... | ... | ... | ... |

FIG.11

CORRECTION FACTOR TABLE

| ANGLE (°) | DETECTED INTENSITY (mV) | CORRECTION FACTOR |
|---|---|---|
| 0 | 0.1 | 1.0 |
| 0 | 0.2 | 1.0 |
| 0 | 0.3 | 1.0 |
| ... | ... | ... |
| 5 | 0.1 | 1.1 |
| ... | ... | ... |
| 270 | 0.1 | 1.0 |
| ... | ... | ... |

FIG.12

DISTANCE CONVERSION TABLE

| DETECTED INTENSITY (mV) | DISTANCE (m) |
|---|---|
| 0.1 | 5.0 |
| 0.2 | 4.9 |
| ... | ... |
| 5.0 | 1.0 |

FIG.13

DETECTION RESULTS TABLE

| ID | DISTANCE (m) | ANGLE (°) | TEMPERATURE (°C) | TEMPERATURE SETTING (°C) |
|---|---|---|---|---|
| 1 | 4.0 | 10 | 27 | 24 |
| 2 | 2.0 | 270 | 24 | 25 |
| ... | ... | ... | ... | ... |
| 8 | 8.5 | 100 | 24 | 27 |

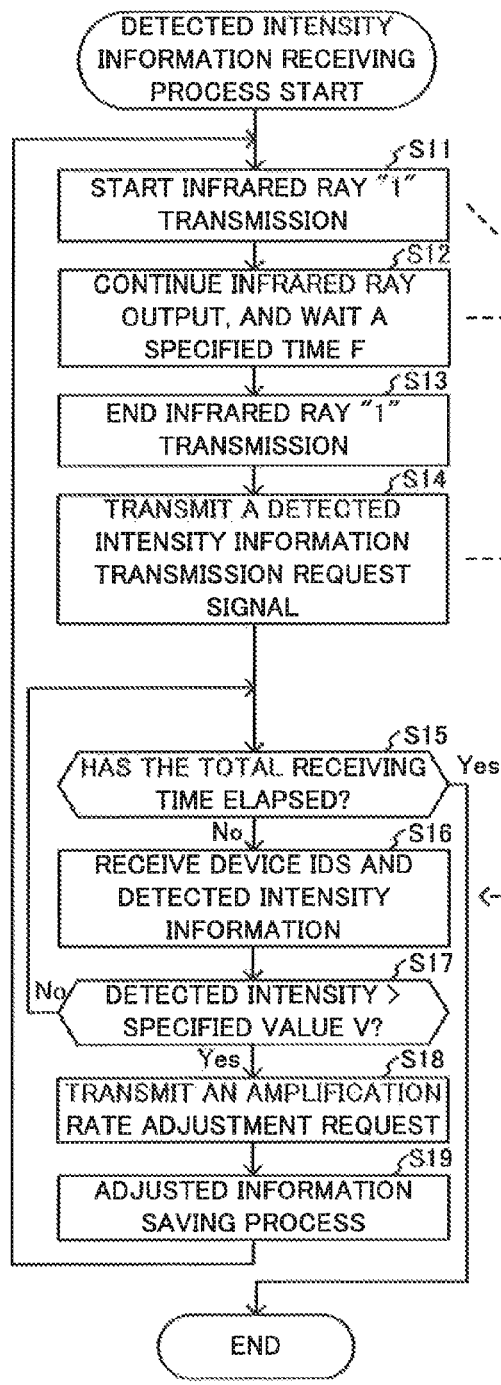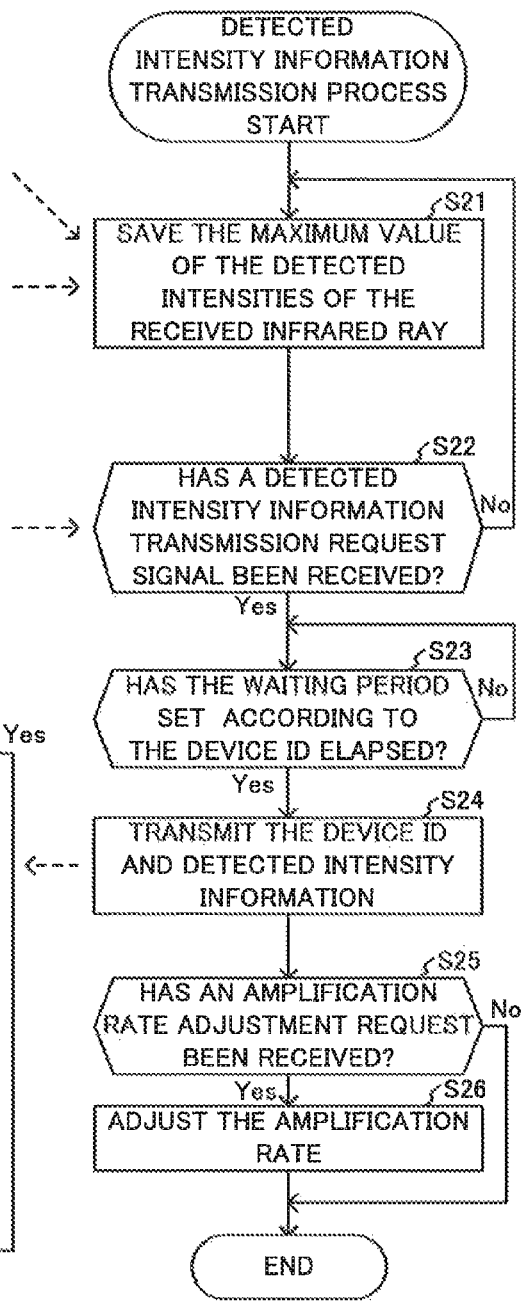

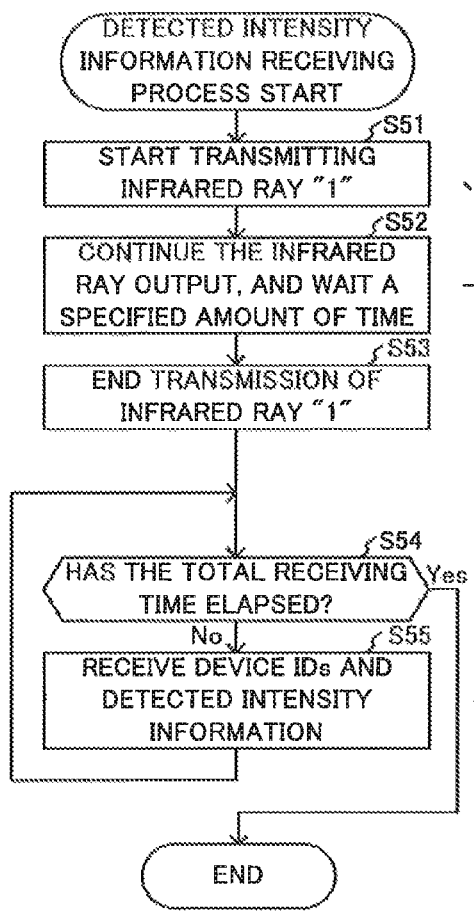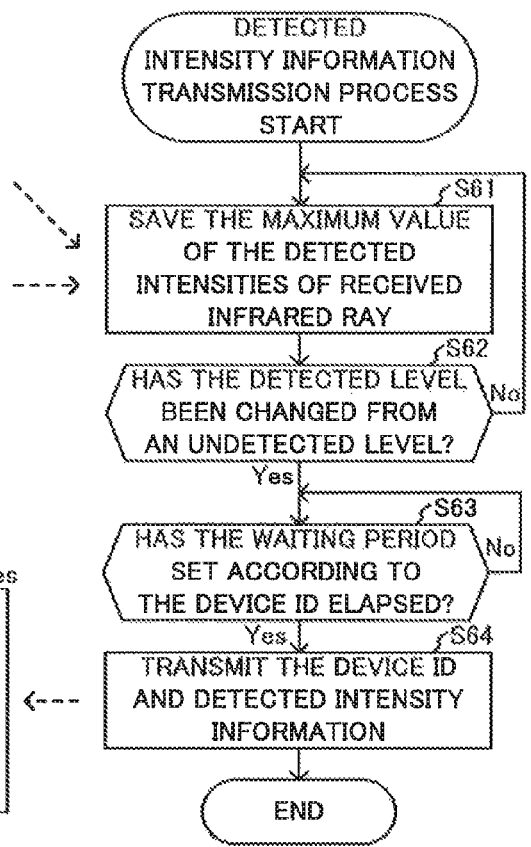

AIR-CONDITIONING SYSTEM AND AIR-CONDITIONING METHOD

CROSS REFERENCE TO RELATED APPLICATIONS

This application is a U.S. national stage application of the International Patent Application No. PCT/JP2011/051828 filed on Jan. 28, 2011.

TECHNICAL FIELD

The present invention relates to an air-conditioning system and air-conditioning method.

BACKGROUND ART

As this kind of technology, there is, for example, technology as disclosed in Patent Literature 1 that changes the temperature setting of an air-conditioner having a sensor that detects room temperature, and a sensor that detects the temperature of a floor-heating radiation panel that performs floor heating based on the detected room temperature, the temperature of the floor-heating radiation panel, and data expressing the comfort characteristics of the user that are set according to the room temperature and floor temperature.

CITATION LIST

Patent Literature

Patent Literature 1: Japanese Patent No. 4,042,480

SUMMARY OF INVENTION

Technical Problem

However, in the technology of Patent Literature 1 above, the temperature setting is changed regardless of the location where the sensor is installed, so there was a problem in that the room temperature cannot be accurately adjusted at that location.

Taking the situation above into consideration, the objective of the present invention is to provide an air-conditioning system and air-conditioning method that can accurately adjust the temperature or humidity at a specified location.

Solution to Problem

In order to accomplish the objective above, the air-conditioning system of the present invention comprises:

a device including a measurement unit that measures temperature or humidity;

a transmitter that is mounted in indoor equipment and that transmits light or electromagnetic waves to the device;

a receiver that is mounted in the indoor equipment and that receives detected intensity information that expresses the detected intensity of the transmitted light or the electromagnetic waves detected by the device;

a detector that detects the distance from the indoor equipment to the device based on the detected intensity expressed by the received detected intensity information; and a controller that controls the air-blowing state of the indoor equipment based on the detected distance and the measured temperature or humidity.

Advantageous Effects of Invention

With the air-conditioning system and air-conditioning method of the present invention, it is possible to accurately adjust the temperature or humidity at a specified location.

BRIEF DESCRIPTION OF DRAWINGS

FIG. 6 is a flowchart illustrating an example of location detection processing that is executed by the location detector;

FIG. 8 is a drawing illustrating an example of a detected intensity table that is stored in memory;

FIG. 11 is a drawing illustrating an example of a correction factor table that is stored in memory;

FIG. 12 is a drawing illustrating an example of a distance conversion table that is stored in memory;

FIG. 13 is a drawing illustrating an example of a detection results table that is stored in memory;

FIG. 14A is a flowchart illustrating an example of the detected intensity information receiving process that is executed by the location detector, and FIG. 14B is a flowchart illustrating an example of the detected intensity information transmission process that is executed by a portable device;

FIG. 18A is a flowchart that illustrates another example of the detected intensity information receiving process that is executed by the location detector, and FIG. 18B is a flowchart that illustrates another example of the detected intensity information transmission process that is executed by a portable device.

DESCRIPTION OF EMBODIMENTS

In the following, an air-conditioning system 1 of an embodiment of the present invention will be explained with reference to the accompanying drawings.

Figure 1:
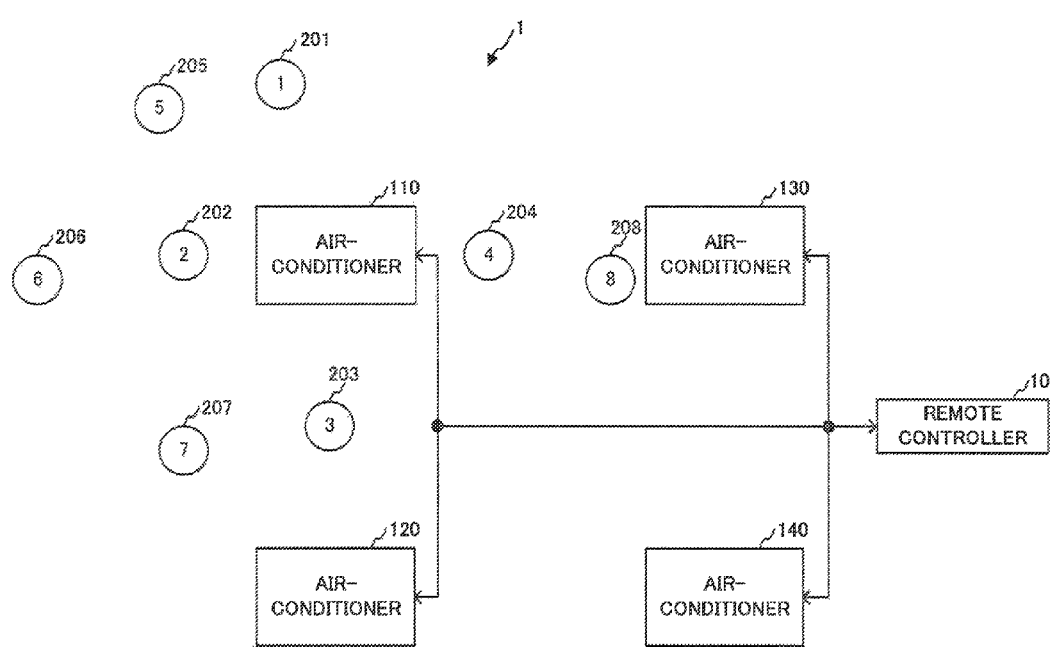
FIG. 1 is a drawing illustrating an example of the configuration of an air-conditioning system of an embodiment of the present invention.

As illustrated in FIG. 1, an air-conditioning system 1 of an embodiment of the present invention is configuration so as to include a remote controller (hereafter referred to as a remote control) 10, air-conditioners 110 to 140, and portable devices 201 to 208.

The remote control 10 is installed on a wall of a room, for example, and is connected to each of the air-conditioners 110 to 140 by way of signal lines. The remote control 10, for example, sets the status, such as the temperature setting, humidity setting, indoor temperature, indoor humidity, air flow, direction, temperature and humidity (hereafter called the air-blowing status) that is outputted from air-conditioner 100, and the operating mode for each of the air-conditioners 110 to 140. It is also possible for the remote control 10 to control only one air-conditioner.

Figure 2:
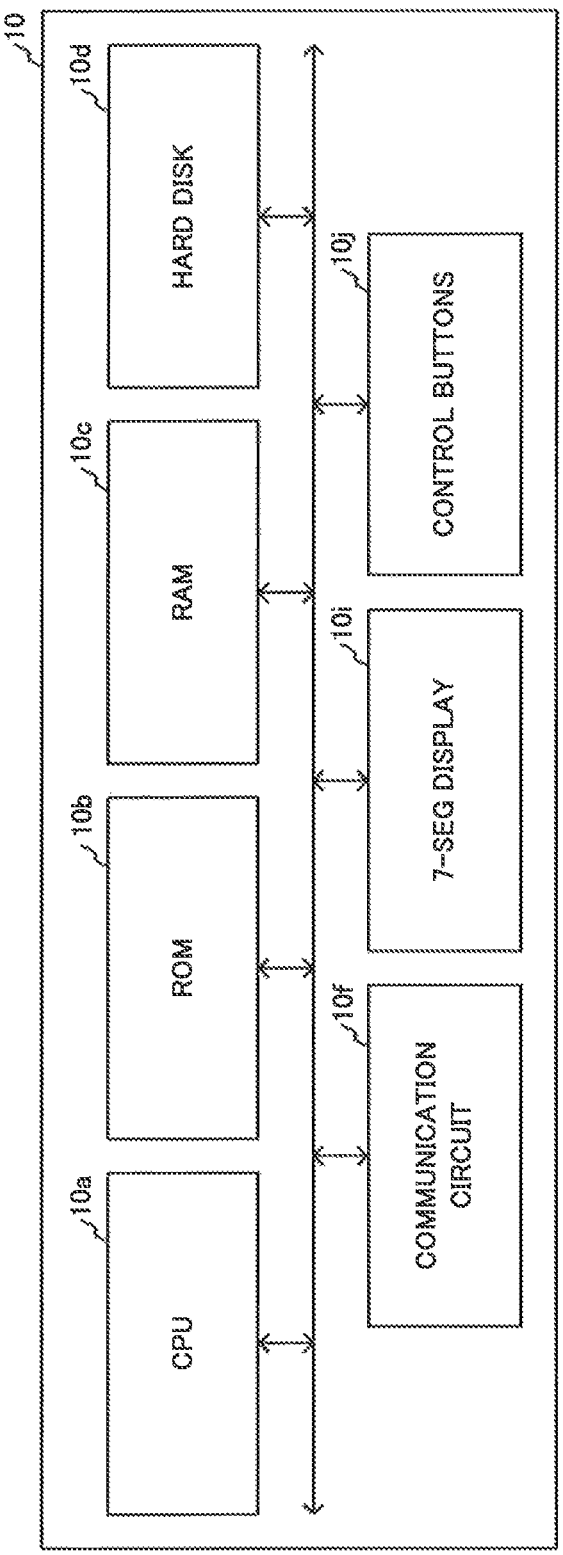
FIG. 2 is a drawing of the hardware configuration of an example of a remote controller.

The remote control 10, as illustrated in FIG. 2, has a CPU (Central Processing Unit) 10a, a ROM (Read Only Memory) 10b, a RAM (Random Access Memory) 10c, a hard disk 10d, a communication circuit 10f, a 7 SEG (SEGment) display 10i and control buttons 10j.

The CPU 10a performs overall control of the remote control 10 by executing software according to programs stored in the ROM 10b or on the hard disk 10d. The RAM 10c temporarily stores information (in other words, data) that is the object of processing while the CPU 10a executes a program.

The hard disk 10d stores tables in which various kinds of information (in other words, data) are saved. The remote control 10 can also have a flash memory instead of a hard disk 10d.

The communication circuit 10f performs serial communication of data among air-conditioners 110 to 140 that are connected by serial lines. The 7 SEG display 10i displays various code, such as error codes, according to signals outputted from the CPU 10a. The control buttons 10j input signals according to operation by a user.

The air-conditioners 110 to 140 each have the same configuration, so mainly the air-conditioner 110 will be explained below.

Figure 3A:
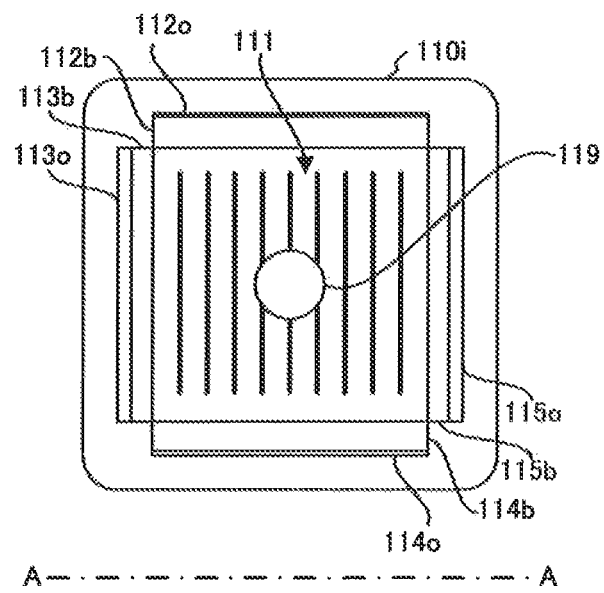
FIG. 3A is a bottom view of indoor equipment of an air-conditioner.

The air-conditioner 110 is constructed, for example, so as to include indoor equipment (in other words, an air-conditioner) 110i that is located on the ceiling of a room, and outdoor equipment. As illustrated in FIG. 3A, air inlets 111, and air outlets 112o to 115o are formed on the bottom surface of the indoor equipment 110i, and a location detector 119 is placed in the center section. The indoor equipment 110i takes in room air through the air inlet 111, and then after the air that is taken in has been adjusted to the temperature and humidity specified by the remote control 10, is blown from the air outlets 112o to 115o at a specified flow rate and in a specified direction. Blades 112b to 115b are provided in the air outlets 112o to 115o as illustrated in FIGS. 3A and 3B in order to control the direction in which the air is blown.

Figure 3B:
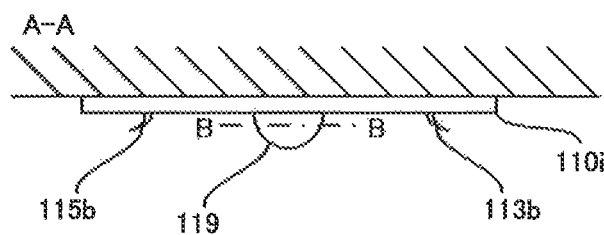
FIG. 3B is a side view of the indoor equipment.

The location detector 119 that is in installed on the bottom surface of the indoor equipment 110i is covered by a transparent hemispherical shaped cover such as illustrated in FIG. 3B, which is the side view of the indoor equipment 110i. On the inside of the location detector 119 there is a rotating shaft 119x such as illustrated in FIG. 4A, which is a cross-sectional view of section B-B in FIG. 3B, a rotating stage 119s, and one transmitter/receiver 119t.

The rotating shaft 119x is the rotating shaft of the rotating stage 119s, and is a shaft that is perpendicular to the bottom surface of the indoor equipment 110i. The rotating shaft 119x is connected to a stepping motor (not illustrated in the figure), and is rotated 90° at a time by the stepping motor according to control by an infrared ray receiving IC (Integrated Circuit) of a receiver 119r. Therefore, the rotating stage 119s that is fastened to the rotating shaft 119x is rotated 90° at a time by the rotation of the rotating shaft 119x.

Figure 4A:
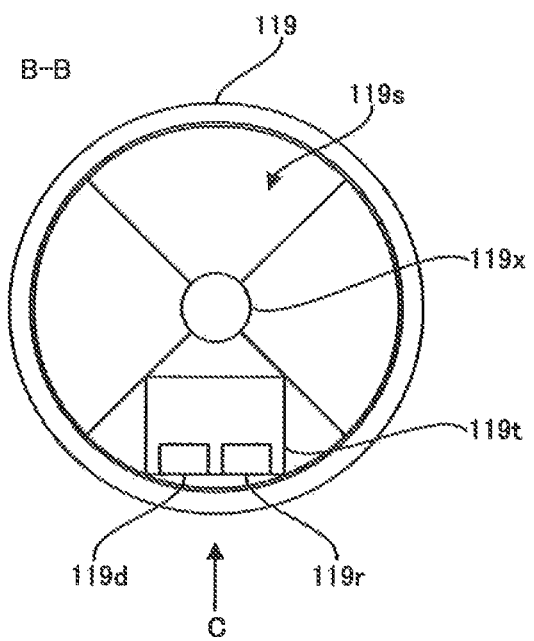
FIG. 4A is a cross-sectional view illustrating an example of a location detector that is mounted in the indoor equipment.
Figure 4B:
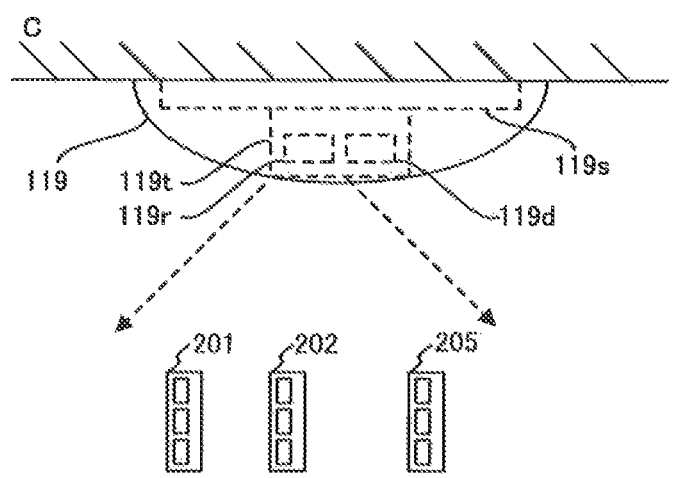
FIG. 4B is a side view illustrating the location detector.

The transmitter/receiver 119t is fastened to the bottom surface of the rotating stage 119s as illustrated in FIG. 4B, which illustrates the location detector 119 as seen from direction C illustrated in FIG. 4A. The transmitter/receiver 119t is installed in one area of four areas formed by dividing the bottom surface of the rotating stage 19s with radial lines that extend from the rotating shaft 119x to the cover of the location detector 119 as illustrated in FIG. 4A. Moreover, the transmitter/receiver 119t has a transmitter 119d that transmits infrared signals through the cover of the location detector 119 from the rotating shaft 119x, and a receiver 119r that receives infrared signals that pass through the cover from a direction that corresponds with the direction in which the transmitter 119d transmits infrared signals. Therefore, as the rotating stage 119s rotates 90° with the rotating shaft 119x, the transmitting/receiving direction of infrared signals by the transmitter/receiver 119t also rotates 90° with the rotating shaft 119x.

The transmitter 119d is constructed so as to include an infrared ray transmitting LED (Light Emitting Diode), and emits an infrared ray by flashing according to control by the infrared ray receiving IC of the receiver 119r. The receiver 119r that includes the infrared ray receiving IC receives infrared signals that are transmitted by the portable devices 201 to 208.

Figure 5A:
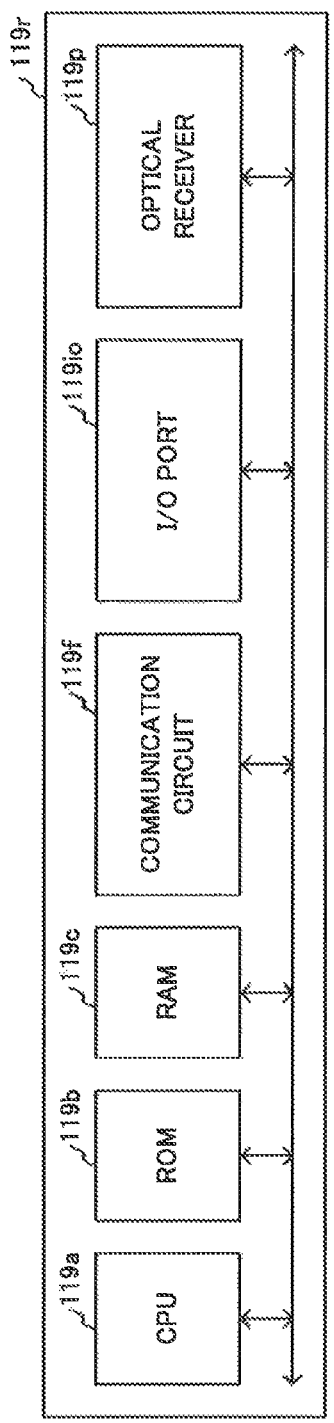
FIG. 5A is a drawing illustrating the hardware configuration of an example of a location detector.

The receiver 119r that includes an infrared ray receiving IC is constructed as illustrated in FIG. 5A so as to also include a CPU 119a, ROM 119b, RAM 119c, communication circuit 119f, I/O port 119io, and optical receiver 119p. The CPU 119a, ROM 119b and RAM 119c are the same as the CPU 10a, ROM 10b and RAM 10c in FIG. 2, so an explanation is omitted. The communication circuit 119f performs serial communication with the remote control 20. The I/O port 119io outputs signals that were outputted from the CPU 119a to the transmitter 119d and the stepping motor. The optical receiver 119p inputs signals that are transmitted by infrared rays from the portable devices 201 to 208 to the CPU 119a.

The portable devices 201 to 208 have ID information (hereafter, called device ID) that identifies the respective device. The device IDs of the portable devices 201 to 208 are different numbers "1" to "8". The portable devices 201 to 208 have the same configuration, so mainly portable device 201 will be explained below.

Figure 5B:
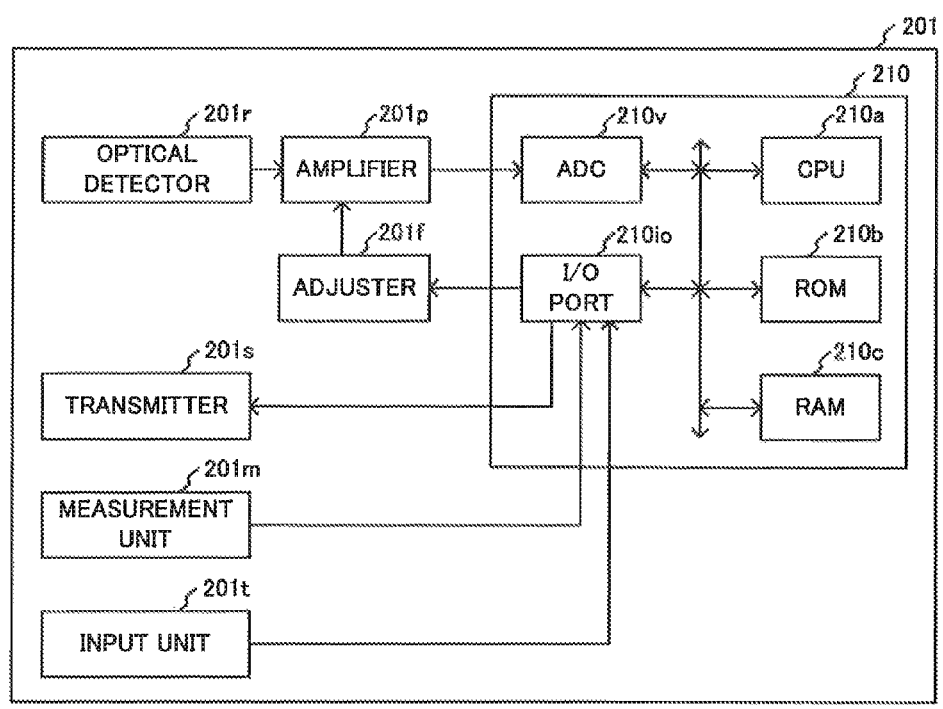
FIG. 5B is a drawing illustrating the hardware configuration of an example of a portable device.

The portable device 201 is a portable device, and as illustrated in FIG. 5B is constructed so as to include an optical detector 201r, an amplifier 201p, an adjuster 201f, a transmitter 201s, a measurement unit 201m, an input unit 201t and an infrared ray receiving IC 210. The optical detector 201r includes, for example, a photodiode. When the optical detector 201r detects an infrared ray that is emitted from the transmitter 119d of the location detector 119, the optical detector 201r generates a voltage according to the intensity of the detected infrared ray.

The amplifier 201p, for example, includes an operational amplifier (hereafter, called an op amp), and amplifies the voltage that is generated by the optical detector 201r. The adjuster 201f is controlled by the infrared ray receiving IC 210 and increases or decreases the amount that the amplifier 201p amplifies the voltage. For example, when the ratio of the value of the voltage after amplification with respect to the value of the voltage before amplification is taken to be the amplification rate, the adjuster 201f adjusts the amplification rate of the amplifier 201p to a rate that is specified by the infrared ray receiving IC 210.

The transmitter 201s includes an infrared ray transmitting LED, and being controlled by the infrared ray receiving IC 210, performs infrared ray transmission of various signals. The measurement unit 201m includes a temperature sensor, and inputs a signal that expresses the temperature that is measured by that temperature sensor to the infrared ray receiving IC 210. The input unit 201t includes control buttons, and inputs temperature setting information to the infrared ray receiving IC 210 that expresses the temperature that was set according to operation by the user.

The infrared ray receiving IC 210 is constructed so as to include a CPU 210a, ROM 210b, RAM 210c, ADC (Analog to Digital Converter) 210v and I/O (Input/Output) port 210io.

The CPU 210a, ROM 210b and RAM 210c are the same as the CPU 10a, ROM 10b and RAM 10c in FIG. 2, so an explanation is omitted. The ADC 210v inputs to the CPU 210a, digital data that expresses the value of the voltage that was amplified by the amplifier 201p. The I/O port 210io inputs a digital signal that expresses the room temperature that was measured by the measurement unit, and temperature setting information that was inputted by the input unit 201t to the CPU 210a. The I/O port 210io also inputs the control signals and the like outputted from the CPU 210a to the transmitter 201s.

The receiver 119r of the location detector 119 illustrated in FIG. 5A uses the hardware that is illustrated in FIG. 5A to detect the location of the portable devices 201 to 208, and executes a location detection process such as illustrated in FIG. 6. As a result, the CPU 119a of the receiver 119r functions as the receiver 191, detector 192, corrector 194 and controller 195 illustrated in FIG. 7. Moreover, the CPU 119a, working together with the ROM 119b and RAM 119c, functions as a memory 193.

Before explaining the location detection process in FIG. 6, the data that is used in the location detection process will be explained.

A memory 193 stores detected intensity tables such as illustrated in FIG. 8. Each of the detected intensity tables has plural records that correlate and save rotation angle information that expresses the rotational angle of the rotating stage 119s, device IDs that identify the portable devices, and detection intensity information that expresses the intensity of an infrared ray that is detected by the portable device when the infrared ray is transmitted when the rotating stage 119s is at the rotation angle (hereafter, referred to as the detection intensity).

Figure 9:
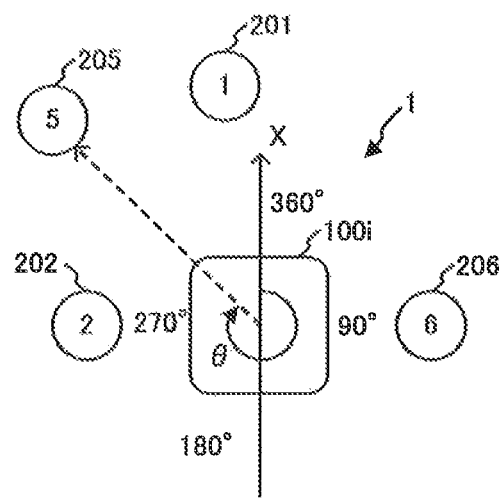
FIG. 9 is a drawing illustrating an example of the rotation angle of a transmitter/receiver that is mounted inside the location detector.

Note that as illustrated in FIG. 9, the rotation angle of the rotating stage 119s is expressed as the angle with respect to a specified coordinate axis X that passes through the rotating shaft 119x of the rotating stage 119s (in other words through the approximate center of the indoor equipment 110i) and is approximately parallel with the rotating surface of the rotating stage 119s. Moreover, a direction toward a certain position from the indoor equipment 110i (hereafter referred to as direction with the indoor equipment 110i as a reference) is also expressed as an angle with respect to a coordinate axis X.

Figure 10:
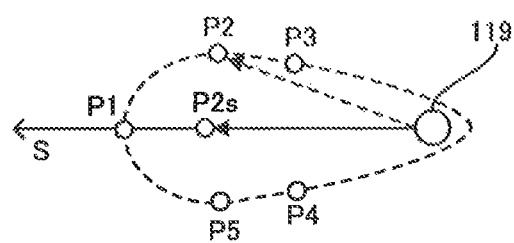
FIG. 10 is a drawing for explaining an example of directivity of infrared ray that are transmitted by the location detector.

Here, the infrared ray that is transmitted from the location detector 119 of the indoor equipment 110i illustrated in FIGS. 4A and 4B have directivity. Therefore, at points P1 to P5 as illustrated in FIG. 10, regardless of whether the distances from the location detector 119 that is mounted in the indoor equipment 110i are different, the intensities of the infrared ray that is detected at points P1 to P5 are the same. In other words, when an infrared ray is transmitted in direction S as illustrated in FIG. 10, even though point P1 that is in direction S with the indoor equipment 110i as a reference is the furthest point of the points P1 to P5 from the indoor equipment 110i, the infrared ray is detected as having the same intensity as the infrared rays from the points P2 to P5.

Therefore, the memory 193 stores a correction factor table as illustrated in FIG. 11. This correction factor table correlates and saves direction information that expresses the direction toward a certain point (for example, point P2) from the indoor equipment 110i, and correction factor information that expresses a correction factor for correcting the detected intensity that is detected at that point (for example, point P2), when an infrared ray is transmitted in the direction S from the indoor equipment 110i, to the detected intensity that is detected at a point (for example, point P2s) separated in the direction S from the indoor equipment 110i the same distance as that point.

Furthermore, the memory 193 stores a distance conversion table such as illustrated in FIG. 12. This distance conversion table has plural records that correlate and save distance information that expresses the distance from the indoor equipment 110i (hereafter, this will be called distance with the indoor equipment 110i as a reference), and detection intensity information that expresses the intensity of an infrared ray that is detected at a point separated from the location detector 119 by that distance.

Furthermore, the memory 193 stores a results table such as illustrated in FIG. 13. This table has plural records that correlate and save the device ID of a portable device, information that expresses the location of that portable device with the indoor equipment 110i as a reference (in other words, the distance and direction with the indoor equipment as a reference), information that expresses the room temperature that was measured by that portable device, and temperature setting information that was inputted to that portable device.

Next, the location detection process that is executed by the location detector 119 using the table above will be explained. The location detector 119, for example, executes the location detection process in FIG. 6 at a specified period of once a day.

Figure 7:
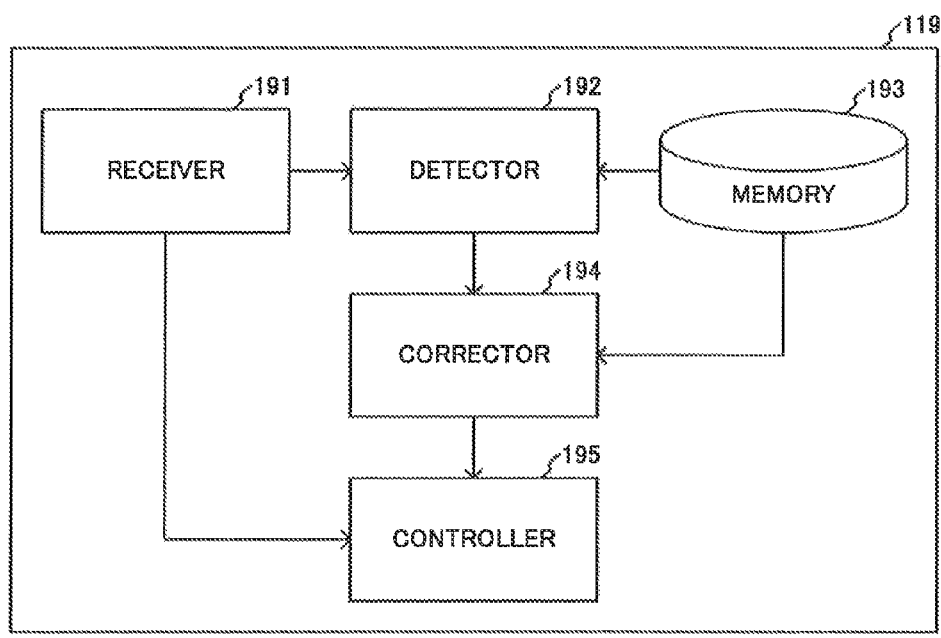
FIG. 7 is a function block diagram illustrating an example of the function of the location detector.

When the location detection process in FIG. 6 is started, the controller 195 in FIG. 7 sets the variable that stores the value expressing the rotation angle of the rotating stage 119s in FIG. 4A (hereafter, referred to as the rotation angle variable) to an initial value of "0°" (step S01). Next, a detected intensity information receiving process for receiving the detected intensity information is executed as illustrated in FIG. 14A (step S02).

When the detected intensity information receiving process in FIG. 14A is started, the controller 195 in FIG. 7 controls the transmitter 119d in FIG. 4A so as to start transmitting an infrared signal (hereafter, called infrared ray "1") that expresses the value "1" (step S11). Here, transmitting an infrared signal that expresses the value "1" causes the infrared ray transmitting LED of the transmitter 119d to light up.

After that, the controller 195 waits for a specified time F during which infrared ray transmitting LED are lit up (in other words, infrared ray output continues) (step S12). This information that expresses this specified time F is stored in advance in the memory 193. When a portable device 201 is located within a specified range, this specified time F is set in advance to a time that is longer than time sufficient for generating a specified voltage by the photodiode of the optical detector 201r in FIG. 5B detecting light after the infrared ray transmitting LED lights up, and that is longer than sufficient time for the amplifier 201p to amplify the voltage by a specified rate. In other words, this specified time F is set in advance based on the response speed of the photodiode and the response speed of the amplifier 201p, and is set to a time that is sufficiently long for the portable devices 201 to 208 to detect that the infrared ray transmitting LED is lit.

After step S12 in FIG. 14A, the controller 195 controls the transmitter 119d so as to end transmission of the infrared signal (in other words, infrared ray "1") that expresses value "1" (step S13). Next, the controller 195 causes the transmitter 119d to transmit a signal expressing a request to transmit the detected intensity information (hereafter, referred to as a detected intensity information transmission request signal) (step S14).

Figure 15:
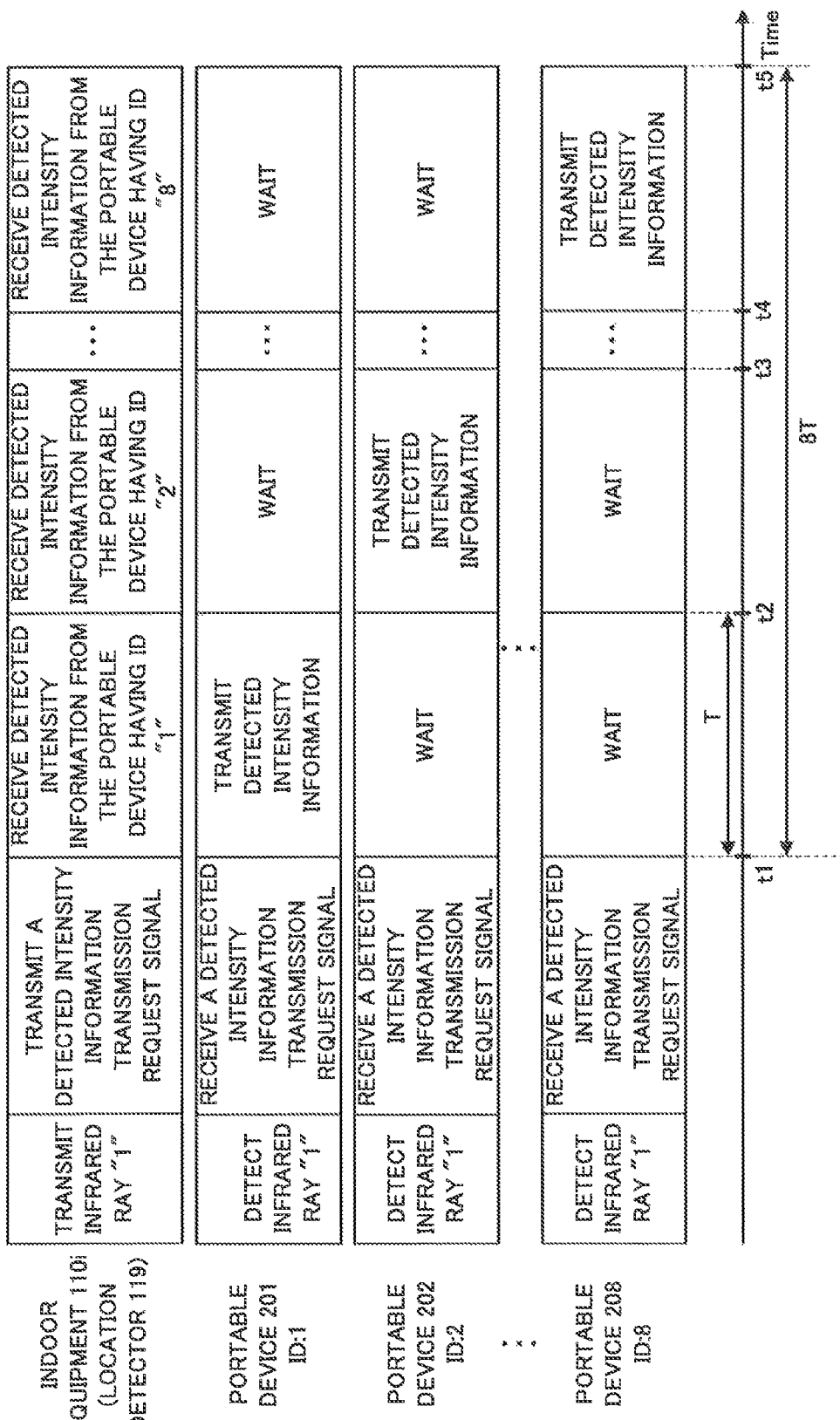
FIG. 15 is a drawing illustrating an example of the relationship between the transmitting/receiving timing of the location detector and the transmitting/receiving timing of a portable device.

Here, as illustrated in FIG. 15, the location detector 119, over a time period T, does not transmit infrared rays while receiving detected intensity information from a portable device. This is so that there is no interference with the infrared ray that is transmitted by the location detector 119 and the infrared ray that is received by the location detector 119.

The portable devices 201 to 208 that transmit detected intensity information transmit detected intensity information over time period T after a respective waiting period that is calculated using Equation (1) below. Here, the portable devices 201 to 208 have a unique device ID, so infrared rays are not transmitted at the same time by two or more of the portable devices 201 to 208. This is done in order to prevent interference.

Therefore, the total receiving time required for the location detector 119 to receive detected intensity information from all of the portable devices 201 to 208 is calculated as "8T" using Equation (2) below. Information that expresses the total number n of portable devices in an air-conditioning system 1, and information that expresses the time length "T" for receiving detected intensity information from this portable device 201 are stored in the memory 193.

$$\text{Wait time} = (\text{Device ID} - 1) \times \text{Time } T \qquad (1)$$

$$\text{Total receiving time} = \text{Total number of portable devices } n \times \text{Time } T \qquad (2)$$

Therefore, after step S14 in FIG. 14A, the receiver 191 in FIG. 7 determines whether or not the total receiving time (in this embodiment, 8T) has elapsed (step S15). Here, when the receiver determines that the total receiving time has not elapsed (step S15: No), the receiver 191 receives, over a period of time T, the device ID and detected intensity information from one of the portable devices 201 to 208 (step S16).

Next, the controller 195 determines whether the detected intensity that is expressed by the acquired detected intensity information is greater than a specified value V (step S17). Information that expresses this specified value V is stored in memory 193. This specified value V is a threshold value that is used for determining whether or not the intensity of the light detected by the optical detector 201r of the portable device 201 illustrated in FIG. 5B is at the saturation level. In other words, for example, when the intensity of the light that is detected by the optical detector 201r becomes stronger than the specified value V because the distance from the indoor equipment 110i is shorter than a specified distance L, the voltage that is generated by the optical detector 201r does not become larger than or it becomes difficult to become larger than a specified voltage v. Therefore, when the intensity of the light that is detected by the optical detector 201r is greater than the specified value V (in other words, step S17: Yes), it is determined that the intensity of the light has reached the saturated level of the optical detector 201r.

In step S17, when it is determined that the detected intensity is greater than the specified value V (step S17: Yes), the controller 195 controls the transmitter 119d so as to transmit a signal that indicates an amplification rate adjustment request for requesting that adjustment be performed in order to lower the amplification rate of the amplifier 201p illustrated in FIG. 5B by a specified rate R (step S18). After that, the controller 195 executes an adjusted information saving process that correlates the device ID that was acquired in step S16 and adjustment information that indicates that the amplification rate of the device identified by the device ID has already been adjusted, and saves the result in the memory 193 (step S19). After that, the acquired detected intensity information is deleted, and after the total receiving time has elapsed, the processing above is repeated from step S11. This is done in order to acquire information in the next execution that expresses a more accurate detected intensity.

Note that in step S17, when it is determined that the detected intensity is not greater than the specified value V, the controller 195, in step S18, can perform control so that a signal is transmitted that expresses an amplification rate adjustment request that requests that the amplification rate of the amplifier 201p be increased by a specified rate R.

In step S17, when the detected intensity is not greater than the specified value V (in other words, the detected intensity is equal to or less than the specified value V) (step S17: No), the processing above is repeated from step S15.

In step S15, when it is determined that the total receiving time has elapsed (step S15: Yes), the receiver 191 ends execution of the detected intensity information receiving process.

Note that the portable device 201 detects an infrared ray by way of the optical detector 201r in FIG. 5B, then starts a detected intensity information transmission process such as illustrated in FIG. 14B, and saves the maximum value of the detected intensities of the received infrared ray (in other words, the voltage amplified by the amplifier 201p in FIG. 5B) (step S21). The processing of step S21 is repeated until a detected intensity information transmitting request signal that is transmitted in step S14 in FIG. 14A is received from the indoor equipment 110i (step S22: No). When receiving a detected intensity information transmitting request signal (step S22: Yes), the portable device 201 waits the waiting period set according to the device ID of portable device 201 (step S23), then performs infrared ray transmission from the transmitter 201s in FIG. 5B of the device ID of the portable device 201 and the detected intensity information that expresses the maximum value of the detected intensity that was saved in step S21 (step S24). After that, when the portable device 201 does not receive a signal that expresses an amplification rate adjustment request within a specified amount of time (step S25: No), the portable device 201 ends the detected intensity information transmission process. On the other hand, when the portable device 201 receives a signal that expresses an amplified rate adjustment request within a specified amount of time (step S25: Yes), the portable device 201, by way of the adjuster 201f, adjusts the amplification rate of the amplifier 201p in FIG. 5B by a specified rate R according to that request (step S26), then ends the detected intensity information transmission process.

In step S02 in FIG. 6, after the detected intensity information and device ID have been received, the corrector 194 in FIG. 7 searches for the device ID stored in the memory 193 that is correlated with the adjusted information. After that, the corrector 194 corrects the detected intensity information of the device that was identified by the device ID that was found to information that expresses the intensity that was obtained by amplifying the detected intensity expressed by the found detected intensity information by a specified rate R. The information that expresses the rate R is stored in memory 193.

Next, the controller 195 performs processing to correlate information that expresses the rotation angle that was stored for the rotating angle coefficient in step S01 or step S06, the detected intensity information and the device ID, and stores the result in the detected intensity table in FIG. 8 (hereafter, this is called the detected intensity information saving process) (step S03).

After that, the detector 192 determines whether or not the detected intensity information receiving process in step S02 was executed for all angles (in other words, 0°, 90°, 180° and 270°) that can be obtained as the rotation angle of the rotating stage 19s in FIG. 4A (step S04). When doing this, when it is determined that the detected intensity information receiving process has not been executed for all angles (step S04: No), the controller 195 causes the rotating stage 119s in FIG. 4A to rotate 90° (step S05). Next, after incrementing the value for the rotation angle variable by "90°" (step S06), the controller 195 repeats the processing above from step S02.

In step S04, when the detector 192 determines that the detected intensity information receiving process has been executed for all angles (step S04: Yes), the detector 192 then executes a detected intensity information reading process that reads the detected intensity information and rotation angle information that is saved in the detected intensity table illustrated in FIG. 8 (step S07).

Next, the detector 192, based on the angles that are expressed by plural rotation angle information that was read, and the detected intensity that is expressed by detected intensity information, executes a relative direction detection process that detects the directions from the indoor equipment 110i to the portable devices 201 to 208 (in other words, the relative directions of the portable devices 201 to 208 with the indoor equipment as a reference) (step S08a).

Figure 16:
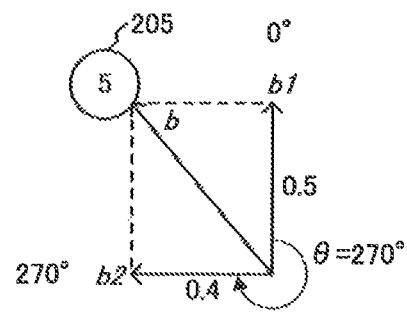
FIG. 16 is a drawing for explaining an example of a calculation method for calculating the direction in which a portable device is located based on the measured detected intensity.

As a detailed example, information is saved in the detected intensity table in FIG. 8 that expresses that the portable device 205 that is identified by device ID "5" detected light having a intensity "0.5" when the rotation angle was "0°", and detected light having a intensity of "0.4" when the rotation angle was "270°". Therefore, the detector 192 as illustrated in FIG. 16 calculates a vector b that is a composition of a vector b1 having a length of "0.5" in a direction having an angle "0°", and a vector b2 having a length "0.4" in a direction having an angle "270°". Next, the detector 192 detects the direction of the calculated vector b as the relative direction of the portable device 205 with the indoor equipment 110i as a reference.

After step S08a in FIG. 6, the corrector 194 executes a correction factor reading process that reads correction factor information from the correction factor table in FIG. 11 in which direction information, which expresses the relative direction that is expressed by the direction of the vector b that was calculated for each portable device 201 to 208, is correlated with detected intensity information, which expresses the detected intensity that is expressed by the length of the vector b (step S08b). After that, the corrector 194 executes a detected intensity correction process for each of the portable devices 201 to 208 that correct the detected intensity by multiplying the detected intensity that is expressed by the magnitude of the calculated vector b by a correction factor that is expressed in the read correction factor information (step S08c).

After that, the detector 192 executes a relative location detection process for each of the portable devices 201 to 208 that detect the relative position with respect to the indoor equipment 110i (step S08d). More specifically, the detector 192 reads the distance information, which is correlated with the detected intensity information that expresses the corrected detected intensity, from the distance conversion table in FIG. 12. Then, the detector 192 detects the location that is expressed by the relative distance that is expressed by the read distance information and the relative direction that was detected in step S08a as the relative location.

After that, the controller 195 executes a detected location information saving process that correlates the device ID and the location information that expresses the relative location (in other words the relative direction and relative distance) of the device identified by that device ID, and saves the result in the results table illustrated in FIG. 13 (step S09), and then ends the located detection process.

Note that after the location detector 119 has ended execution of the location detection process for the air-conditioner 110, the location detector 119 then performs infrared transmission of a signal that expresses a power-mode switching request that requests each of the portable devices 201 to 208 to switch to a power-saving mode. When the portable devices 201 to 208 receive the signal expressing a power-saving mode switching request, the portable devices 201 to 208 reduce power consumption by mainly stopping operation of the optical detector 201r, which has the photodiode, and the infrared ray receiving IC 210 in FIG. 5B. After that, the portable devices 201 to 208 intermittently turn power on to the optical detector 201r and infrared ray receiving IC 210 at specified intervals such as 10-minute intervals.

Figure 17A:
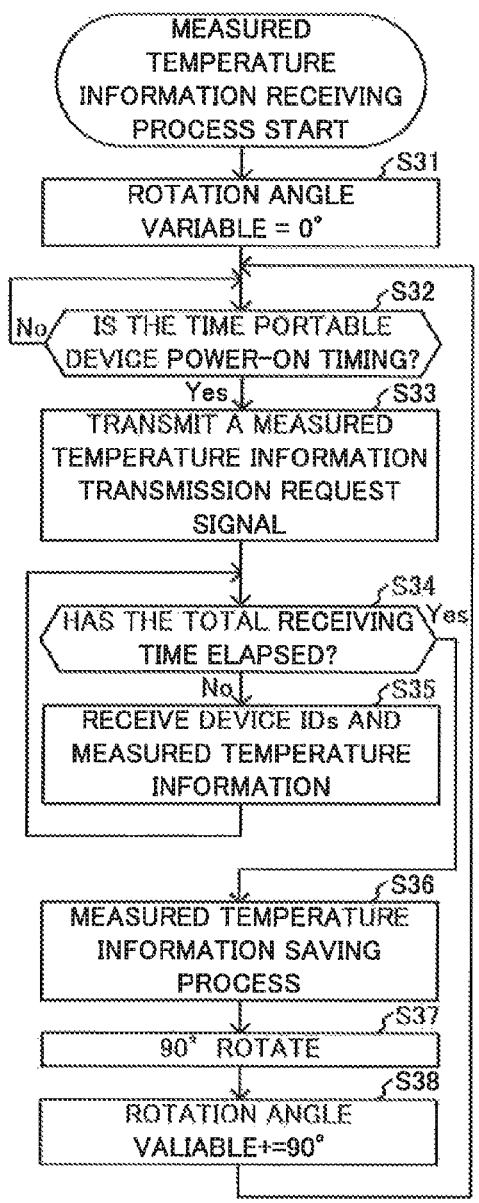
FIG. 17A is a flowchart illustrating an example of the measured temperature information receiving process that is executed by the location detector.

Therefore, after the location detection process that was explained with reference to FIG. 6 ends, the location detector 119 performs a measured temperature information receiving process such as illustrated in FIG. 17A that receives measured temperature information that expresses the temperature that was measured by the portable devices 201 to 208 at the timing that the portable devices 201 to 208 turn the power ON (hereafter, referred to as power-ON timing).

After execution of the measured temperature information receiving process has started, the location detector 119 sets a value expressing "0°" for the rotation angle variable in the same way as in step S01 in FIG. 6 (step S31). Next, based on a timer value of a timer that measures the elapsed time from the time when an infrared signal expressing a power-saving mode switching request was transmitted, the location detector 119 determines, whether or not the time is at the timing when the power to the portable devices 201 to 208 is turned ON (step S32). When doing this, when it is determined that the time is not at the timing for turning the power ON (step S32: No), the location detector 119 sleeps for a specified time, and then repeats the process of step S32.

On the other hand, when the location detector 119 determines that the time is the timing for turning the power ON (step S32: Yes), the location detector 119 transmits a signal the expresses a request for transmission of measured temperature information that expresses the measured temperature (hereafter, called a measured temperature information transmission request signal) (step S33). After that, the location detector 119, as in steps S15 and S16 in FIG. 14A, correlates and receives the device IDs of the portable devices 201 to 208, the measured temperature information that expresses the temperature measured by the portable devices 201 to 208, and temperature setting information that was inputted to each of the portable devices 201 to 208 during the total receiving period (steps S34 and S35).

Next, the location detector 119 executes a measured temperature information saving process that correlates the received device IDs, measured temperature information and temperature setting information, and saves the results in the results table in FIG. 13 (step S36). After that, as in steps S05 and S06 in FIG. 6, the location detector 119 causes the rotating stage 119s in FIG. 4A to rotate 90°, and after incrementing the value of the rotation angle variable by "90°" (steps S37 and S38), repeats the processing above from step S32.

Figure 17B:
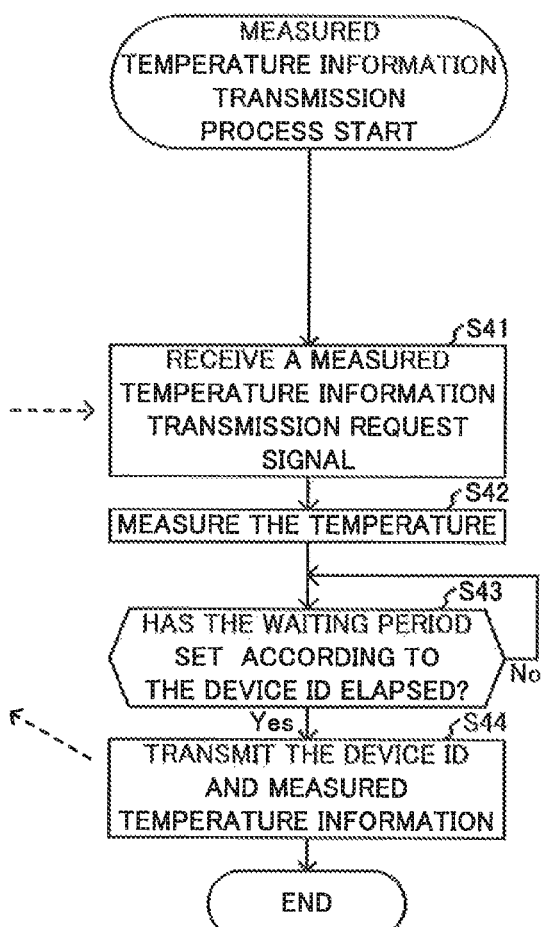
FIG. 17B is a flowchart illustrating an example of the measured temperature information transmission process that is executed by a portable device.

Note that when the time is the power-ON timing, the portable devices 201 to 208 each start the measured temperature information transmission process in FIG. 17B. Hereafter, the measured temperature information transmission process that is executed by the portable device 201 will be explained, and explanations of the measured temperature information transmission processes by the portable devices 202 to 208 will be omitted.

After the measured temperature information transmission process has started, when the portable device 201 receives information that expresses a measured temperature information transmission request that was transmitted in step S33 in FIG. 17A (step S41), the portable device 201 measures the temperature in the room (in other words, room temperature) by way of the measurement unit 201m in FIG. 5B (step S42). After that, as in steps S23 and S24 in FIG. 14B, after waiting a waiting period that is set according to the device ID (step S43), the portable device 201 performs infrared transmission of the device ID, measured temperature information and temperature setting information (step S44), and then ends execution of the measured temperature information transmission process.

After that, the location detector 119, at specified intervals, for example 10-minute intervals, references the measured temperature information and temperature setting information that was correlated with the same device ID and saved in the detection results table in FIG. 13, and calculates the difference between the room temperature that is expressed by the referenced measured temperature information and the temperature setting that is expressed by the referenced temperature setting information. The location detector 119 can also calculated the difference between the room temperature that is expressed by the reference measured temperature information and the temperature setting that was set by the user using the remote control 20. In this case, the temperature setting is saved in the RAM 10c or hard disk 10d of the remote control 20 in FIG. 2, and after receiving the temperature setting from the remote control 20, the location detector 119 saves the temperature setting in the memory 193.

Next, the location detector 119 identifies the locations among the detected portable devices 201 to 208 where the calculated difference is greater than a specified temperature. After that, the location detector 119 based on the calculated difference and the identified location, controls the air flow, direction, temperature and humidity (in other words, the blowing state) of the air that is blown from the air-conditioner 110. More specifically, when the difference between the room temperature at a location that is further than a specified distance from the indoor equipment 110i of the air-conditioner 110 and the temperature setting is greater than a specified temperature, the location detector 119 controls the blades 112b to 115b in FIG. 3A and FIG. 3B so that air is blown in the direction of that location, or air flow that is blown from the air outlets 112o to 115o in FIG. 3A is increased. Moreover, at a location where the calculated difference is greater than a specified temperature, when the room temperature is higher than the temperature setting, the location detector 119 performs control to lower the temperature or the humidity of the air that is blown from the air outlets 112o to 115o, and when the room temperature is lower than the temperature setting, performs control to raise the temperature of the blown air. This control process can be executed by the remote control 20 using the hardware in FIG. 2.

Note that in this embodiment, the case was explained in which the portable devices 201 to 208 measure the room temperature by way of the measurement unit 201m in FIG. 5B, and the location detector 119 controls the air-blowing state of air blown from the air-conditioner 110 based on the measured room temperature; however, the invention is not limited to this. For example, it is possible to employ configuration in which the portable devices 201 to 208, by way of the measurement unit 201m in FIG. 5B, measure the humidity of the room where the air-conditioner 110 is located, and the location detector 119 controls the air-blowing state of the air-conditioners 110 to 140 based on the measured humidity.

Moreover, in this embodiment, the case was explained in which the portable device 201 is such that temperature setting information is inputted according to user operation by way of the input unit 201t in FIG. 5B, and the location detector 119 controls the air-blowing state of the air-conditioner 110 based on the difference between the temperature setting that is expressed by the temperature setting information that was inputted by way of the portable device 201 and the room temperature that was measured by the portable device 201. However, the invention is not limited to this and configuration in possible in which the portable device 201 is such that humidity setting information is inputted according to user operation by way of the input unit 201t, and the location detector 119 controls the air-blowing state of the air-conditioner 110 based on the difference between the humidity setting that is expressed by the humidity setting information that was inputted by way of the portable device 201 and the room temperature that was measured by the portable device 201. Moreover, it is possible to combine that configuration with the configuration of this embodiment.

Furthermore, in this embodiment, the case in which the location detector 119 performed transmits an infrared ray, and the portable devices 201 to 208 detect the intensity of the infrared ray that is transmitted from the location detector 119; however, the invention is not limited to this. For example, it is also possible for the location detector 119 to transmit a visible light ray, an ultraviolet ray or electromagnetic waves, and for the portable devices 201 to 208 to detect the intensity of the visible light ray, the ultraviolet ray or the electromagnetic waves that is transmitted from the location detector 119.

With the configuration above, the air-blowing state of the indoor equipment 110i is controlled based on the distance that is calculated by the portable devices 201 to 208 based on the detected intensity of the light or electromagnetic waves, and measured room temperature or humidity, so, for example, even in the case where the locations of the portable devices 201 to 208 change, it is possible to adjust the room temperature or humidity at the locations of the portable devices 201 to 208 more accurately than was performed conventionally.

With the configuration described above, the direction from the indoor equipment 110i toward the portable devices 201 to 208 is detected based on the direction in which light or electromagnetic waves are transmitted, and the detected intensity of the light or electromagnetic waves in that direction, so, for example, even when the locations of the portable devices 201 to 208 change, it is possible to detect the locations of the portable devices 201 to 208 more accurately than was performed conventionally.

Furthermore, with the configuration described above, the transmitter/receiver 119t of the location detector 119 that transmits light or electromagnetic waves is rotated, so it is possible to detect the locations of the portable devices 201 to 208 in a wider range than when not rotated.

Moreover, with the configuration described above, when the light ray or electromagnetic waves from the indoor equipment 101i are transmitted in a specified direction S such as illustrated in FIG. 10, after the detected intensities that are detected by the portable devices 201 to 208 are corrected to the detected intensity that is detected by the portable device that is located in that specified direction S, the distances from the indoor equipment 110i to the portable devices 201 to 208 are detected based on the corrected detected intensity. Therefore, it is possible to detect the distances from the indoor equipment 110i based on the portable devices for a small of number transmission directions of light or electromagnetic waves more accurately than was performed conventionally.

Furthermore, with the configuration described above, the air-blowing state of the indoor equipment is controlled based on the difference between the temperature settings that are expressed by information that is inputted to each of the portable devices 201 to 208 that are carried by a user and the room temperature that is observed by each of the portable devices 201 to 208, or the difference between the humidity settings that are expressed by inputted information and the humidity that is observed by each of the portable devices 201 to 208, and the distance from the indoor equipment to the portable devices 201 to 208, so even when the user moves, it is possible to achieve the room temperature or humidity that was set by the user more accurately than was done conventionally.

With the configuration described above, for example, when the intensity of the light that is detected by the optical detector 201r becomes greater than a specified intensity because the distance from the indoor equipment 110i to the portable device 201 is closer than a specified distance L, the location detector 119 that is mounted in the indoor equipment 110i transmits a signal expressing an amplification rate adjustment request that requests that the amount that the amplifier 201p amplifies the voltage be lowered. Therefore, by lowering the amount that the portable device 201 amplifies the voltage according to that signal, it is possible to detect the distance from the indoor equipment 110i to the portable device 201 more accurately than was done conventionally. The same can be performed for portable devices 202 to 208 as well.

Moreover, with the configuration described above, for example, when the intensity of the light that is detected by the optical detector 201r becomes less than a specified intensity because the distance from the indoor equipment 110i to the portable device 201 is further than a specified distance, the location detector 119 that is mounted in the indoor equipment 110i transmits a signal expressing an amplification rate adjustment request requests that the amount that the amplifier 201p amplifies the voltage be raised. Therefore, by raising the amount that the portable device 201 amplifies the voltage according to that signal, it is possible to detect the distance from the indoor equipment 110i to the portable device 201 more accurately than was done conventionally.

Here, of the module that is used for infrared communication and the module that measures the intensity of an infrared ray, the module that measures the intensity of an infrared ray often has a slower response speed. The module that measures the intensity of an infrared ray has a characteristic in that it is necessary to amplify the voltage generated by detection of light more, so that the manufacturing cost of the module can easily increase, and thus often the increase in manufacturing cost is suppressed by lowering the response speed. Therefore, in order to measure the intensity of an infrared ray more accurately than was done conventionally, it is necessary, by performing continuous infrared ray transmission of a signal expressing the value "1", to cause the LED to be lit up longer than when continuously lit up during infrared communication. In order to do this, the transmitter 119d of the location detector 119 that is illustrated in FIG. 4, in the case where the portable devices 201 to 208 detect the intensity of an infrared ray, lights up the LED for a longer time than when transmitting a signal. Moreover, the transmitter 119d lights up the LED for a specified time F that is longer than the response time of the optical detector 201r and the response time of the amplifier 201p illustrated in FIG. 5B. Furthermore, the portable device 201 does not measure the receiving intensity during communication with the location detector 119 that is mounted in the indoor equipment 110i. Therefore, it is possible to measure the intensity of the light emitted from the location detector 119 more accurately than done conventionally without depending on the response speeds of the optical detector 201r and amplifier 201p (in other words, the light detections speed and voltage amplification speed).

In this embodiment, the case was explained in which in step S14 to step S16 in FIG. 14A, after transmitting a detected intensity information transmission request signal, the location detector 119 receives device IDs and detected intensity information. Moreover, the case was explained in which in step S22 to step S24 in FIG. 14B, after receiving a detected intensity information transmission request signal, the portable device 201 transmits the device ID and detected intensity information.

However, the invention is not limited to this, as illustrated in FIG. 18A, it is possible to employ configuration in which after the location detector 119 has transmitted an infrared signal that expresses the value "1" (steps S51 to S53), the location detector 119 acquires the device IDs and the detected intensity information from the portable devices 201 to 208 over the total receiving time (steps S54 and S55) without transmitting a detected intensity information transmission request signal.

In this configuration, the portable device 201, as illustrated in FIG. 18B, after saving the maximum value of the detected intensities of the received infrared ray (step S61), repeats step S61 above until the saved value (hereafter, referred to as the detected level) changes from an undetected level to a specified value or greater. It is possible to employ configuration in which when the detected level changes from an undetected level to a level having specified value or greater (step S62), the portable device 201 waits a waiting period that is set according to the device ID of the portable device 201, and then transmits a device ID and detected intensity information (steps S63 and S64). The undetected level is a value that is saved by the portable device 201 when infrared rays are not detected, and is a value that is measured in advance for checking the background noise level beforehand. This undetected level is stored in the RAM 201c of the portable device 201.

With this configuration, the portable device 201 transmits detected intensity information when the detected level changes from an undetected level to a specified value or greater, so operation can be performed more easily than in the detected intensity information transmission process in FIG. 14B, and the portable device 201 is able to perform infrared transmission of detected intensity information to the location detector 119 of the indoor equipment 110i while preventing interference that occurs due to infrared transmission from the other portable devices 202 to 208. Therefore, that operation can be achieved by using hardware such as electronic circuits without having the infrared ray receiving IC 210 in FIG. 5B, so it is possible to reduce the manufacturing cost of the portable device 201.

Figure 19:
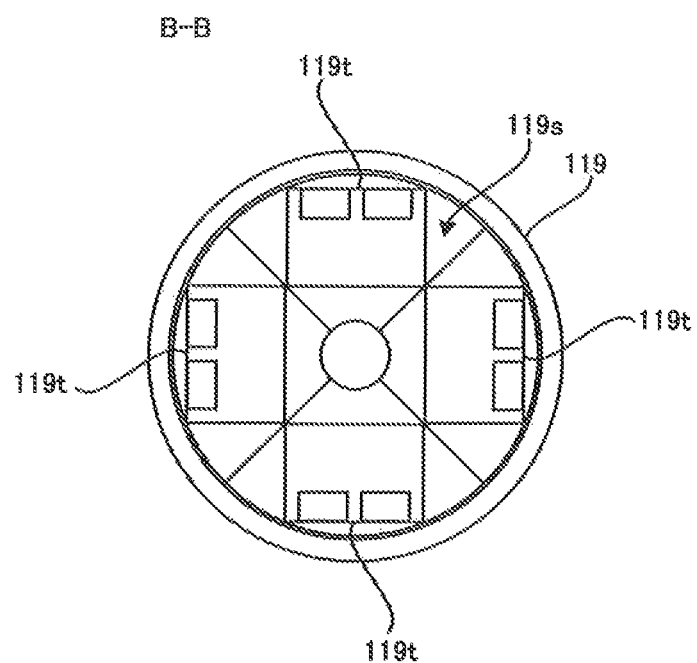
FIG. 19 is a cross-sectional view that illustrates another example of a location detector of the indoor equipment.

In this embodiment, as illustrated in FIG. 4A, the case was explained in which the location detector 119 has one transmitter/receiver 119t that transmits and receives infrared rays, and by rotating 90° at a time the rotating stage 119s on which the transmitter/receiver 119t is fastened around the rotating shaft 119x, the direction in which the location detector 119 transmits an infrared ray and receives infrared rays is changed in the four directions aligned with 0°, 90°, 180° and 270° with reference to the X axis in FIG. 9; however, the invention is not limited to this. For example, as illustrated in FIG. 19, configuration can be employed in which the location detector 119 has four transmitter/receivers 119t that transmit an infrared ray and receive infrared rays in the four directions aligned with 0°, 90°, 180° and 270°.

In configuration in which the location detector has four transmitter/receivers 119t, configuration can be employed in which the location detector 119 performs infrared ray communication using all of the four transmitter/receivers 119t. With this configuration, the directivity of the infrared rays that are transmitted from the location detector 119 is nearly the same at all angles from 0° to 360° (in other words, directivity becomes hemispherical), so that at nearly all angles, the intensity of the detected infrared rays changes nearly the same according to the distance from the location detector 119.

In a configuration in which the location detector 119 has four transmitter/receivers 119t, it is possible to employ a configuration in which the location detector 119, together with one of the four transmitter/receivers 119t selected as necessary, performs infrared communication using the selected transmitter/receiver 119t. With this configuration, the location detector 119 can change the direction for transmitting an infrared ray and receiving infrared rays without having to rotate a rotating stage 119s, so that it is possible to change the communication direction in a short period of time.

In this embodiment, the case was explained in which the portable device 201 in step S24 in FIG. 14B transmits detected intensity information that expresses the maximum value of the detected intensity that was saved in step S21; however, the invention is not limited to this. For example, configuration can be employed in which detected intensity information that expresses the maximum value of the detected intensity that was saved at a time that is a specified time L or more before the time when the detected intensity information transmission request signal was received (in other words, before receiving the infrared signal for value "1"), and detected intensity information that expresses the maximum value of the detected intensity that was saved in step S21 are transmitted, or configuration can be employed in which the difference between these two maximum values for the detected intensity is detected as the received intensity of an infrared ray that was transmitted from the location detector 119. With this configuration, it is possible to reduce the effect of background noise, and detect the intensity of the received infrared ray that was transmitted from the location detector 119.

In this embodiment, as was explained in step S08a in FIG. 6, the detector 192, based on the angles expressed by the plural items of rotation angle information read from the detected intensity table in FIG. 8, and the detected intensities expressed by the detected intensity information, detects the relative diections of the portable devices 201 to 208 with the indoor equipment 110i as reference; however, the invention is not limited to this. For example, configuration can be employed in which, the detector 192, based on angles that are expressed by the plural items of rotation angle information read from the detected intensity table in FIG. 8, and the relative distances that are detected based on the detected intensities expressed by the detected intensity information (in other words, distances with reference to the indoor equipment 110i), detects the relative directions of the portable devices 201 to 208. More specifically, information is saved in the detected intensity table in FIG. 8 that expresses that the portable device 205 identified by the device ID "5" detected light having a intensity of "0.5" at a rotation angle of "0°", and detected light having a intensity of "0.4" at a rotation angle of "270°". Therefore, in this configuration, the detector 192, from the distance conversion table in FIG. 12, detects distances L1 and L2 that are expressed by information that correlated with the information that expresses intensities "0.5 and "0.4". After that, the detector 192 calculates a composited vector that is a composition of a vector having a length L1 in a direction having an angle "0°" and a vector having a length L2 in a direction having an angle "270°", and detects the direction of the calculated composited vector as the relative direction of the portable device 205 with reference to the indoor equipment 110i.

Note that while a location detector 119 pre-equipped with a configuration for realizing the functionality according to the present embodiment may be provided, an existing location detector may also be made to function as the location detector 119 of the air-conditioning system 1 according to the present embodiment by applying a program. In other words, by applying a control program for realizing the respective functional components with the location detector 119 illustrated by way of example in the foregoing embodiment such that the control program is executable by a computer (such as a CPU) that controls an existing location detector, the existing location detector is made to function as a location detector 119 of the air-conditioning system 1 according to the present embodiment.

The method for distributing this kind of program is arbitrary; for example, in addition to being able to be stored on a recording medium such as a memory card, CD-ROM, DVD-ROM or the like and distributed, the program can also be distributed by way of a communication medium such as the Internet. The air-conditioning method of the present invention can be achieved by using the air-conditioning system 1.

When the functions described above are achieved by sharing with the OS (Operating System), or when achieved by the OS working together with applications, it is possible to store and distribute the portions other than the OS on a medium, and download those portions.

Moreover, various embodiments and modifications of the present invention are possible without deviating from the wide spirit and scope of the present invention. Furthermore, the embodiment described above is for explaining the present invention, and does not limit the range of the present invention. In other words, the range of the present invention is as disclosed in the claims and not the embodiments. Various modifications that are within the range of the claims or within the intended range of an equivalent invention are regarded as being within the range of the present invention.

INDUSTRIAL APPLICABILITY

The present invention is applied to an air-conditioning system for air conditioning a room.

REFERENCE SIGNS LIST

1 Air-conditioning system
10 Remote controller
10a CPU
10b ROM
10c RAM
10d Hard disk
10f Communication circuit
10i 7 SEG display
10j Control buttons
20 Remote control
110 to 140 Air-conditioner
110i indoor equipment
111 Air intake
112o to 115o Air outlet
112b to 115b Blade
119 Location detector
119a CPU
119b ROM
119c RAM
119d Transmitter
119f Communication circuit
119g Infrared ray receiving IC
119io I/O port
119p Optical receiver
119s Rotating stage
119t Transmitter
119r Receiver
119x Rotating shaft
191 Receiver
192 Detector
193 Memory
194 Corrector
195 Controller
201 to 208 Portable device
201f Adjuster
201m Measurement unit
201p Amplifier
201r Optical detector
201s Transmitter
201t Input unit
210 Infrared my receiving IC
210a CPU
210b ROM
210c RAM
210io I/O port
210v ADC

The invention claimed is:

1. An air-conditioning system, comprising:
a transmitter that is mounted in indoor equipment and that transmits light or electromagnetic waves to a device including a measurement unit that measures temperature or humidity;
a converter that converts a transmission direction of the light or electromagnetic waves from the transmitter mounted in the indoor equipment into plural directions;
a receiver that is mounted in the indoor equipment and that receives detected intensity information that expresses the detected intensity of the transmitted light or the electromagnetic waves detected by the device;
a detector that detects the distance from the indoor equipment to the device and the direction from the indoor equipment to the device based on the plural converted transmission directions and the detected intensities of the light or the electromagnetic waves transmitted in the plural directions respectively, detected by the device, and expressed by the received detected intensity information; and
a controller that controls the air-blowing state of the indoor equipment based on the detected direction and distance and the measured temperature or humidity.

2. The air-conditioning system according to claim 1, wherein
the detector calculates a composited vector a magnitude of which is determined based on the detected intensity by compositing plural vectors directions of which are the plural directions respectively, and detects a direction of the composited vector as the direction from the indoor equipment to the device.

3. The air-conditioning system according to claim 1, wherein
the light or electromagnetic waves that are transmitted by the transmitter mounted in the indoor equipment have directivity; and
further comprising:
a memory that correlates and stores direction information that expresses direction with reference to the indoor equipment and information that expresses a correction factor that, when light or electromagnetic waves are transmitted in a specified direction from the transmitter mounted in the indoor equipment, corrects the detected intensity, which is detected by a device that is located in the direction expressed by the direction information, to detection intensity, which is detected at a location in the specified direction that is separated from the indoor equipment by the same distance as the device; and
a corrector that corrects the detected intensity that is expressed by the received detected intensity information by using the correction factor that is expressed by information that is correlated with information that expresses the detected direction; wherein the detector detects the distance from the indoor equipment to the device based on the corrected detected intensity.

4. The air-conditioning system according to claim 1, wherein
the device comprises:
an optical detector that detects light emitted from the transmitter mounted in the indoor equipment, and generates a voltage;
an amplifier that amplifies the voltage generated by the optical detector;
an adjuster that adjusts the amount that the amplifier amplifies the voltage; and
a transmitter transmits information that expresses the voltage that is amplified by the amplifier as detected intensity information that expresses the intensity of the light that was detected by the optical detector; wherein
the transmitter mounted in the indoor equipment, when the detected intensity that is expressed by the received detected intensity information is greater than a specified intensity, transmits a signal that requests that the amplifier perform adjustment so that the amount that the voltage to be amplified is lowered.

5. The air-conditioning system according to claim 4, wherein
the transmitter mounted in the indoor equipment transmits the signal by flashing, and when the device detects the intensity of that light, lights up for a time period that is longer than when transmitting the signal.

6. The air-conditioning system according to claim 4, wherein
the device is a portable device that further comprises:
an input unit that inputs temperature setting information that expresses the temperature setting, or humidity setting information that expresses the humidity setting; wherein
the transmitter of the device transmits the inputted temperature setting information or humidity setting information;
the receiver that is mounted in the indoor equipment receives the transmitted temperature setting information or humidity setting information; and
the controller controls the air-blowing state of the indoor equipment based on the difference between the measured temperature and the temperature setting that is expressed by the received temperature setting information or the difference between the measured humidity and the humidity setting that is expressed by the received temperature setting information, and the detected distance.

7. The air-conditioning system according to claim 1, wherein
the device comprises:
an optical detector that detects light emitted from the transmitter mounted in the indoor equipment, and generates a voltage;
an amplifier that amplifies the voltage generated by the optical detector;
an adjuster that adjusts the amount that the amplifier amplifies the voltage; and
a transmitter transmits information that expresses the voltage that was amplified by the amplifier as detected intensity information that expresses the intensity of the light that was detected by the optical detector; wherein
the transmitter mounted in the indoor equipment, when the detected intensity that is expressed by the received detected intensity information is less than a specified intensity, transmits a signal that requests that the amplifier perform adjustment so that the amount that the voltage to be amplified is raised.

8. The air-conditioning system according to claim 7, wherein
the transmitter mounted in the indoor equipment transmits the signal by flashing, and when the device detects the intensity of that light, lights up for a time period that is longer than when transmitting the signal.

9. The air-conditioning system according to claim 7, wherein
the device is a portable device that further comprises:
an input unit that inputs temperature setting information that expresses the temperature setting, or humidity setting information that expresses the humidity setting; wherein
the transmitter of the device transmits the inputted temperature setting information or humidity setting information;
the receiver that is mounted in the indoor equipment receives the transmitted temperature setting information or humidity setting information; and
the controller controls the air-blowing state of the indoor equipment based on the difference between the measured temperature and the temperature setting that is expressed by the received temperature setting information or the difference between the measured humidity and the humidity setting that is expressed by the received temperature setting information, and the detected distance.

10. An air-conditioning system, comprising:
a transmitter that is mounted in indoor equipment and that transmits in plural directions light or electromagnetic waves having directivity to a device including a measurement unit that measures temperature or humidity;
a memory that correlates and stores direction information that expresses direction with reference to the indoor equipment and information that expresses a correction factor that, when light or electromagnetic waves are transmitted in a specified direction from the transmitter mounted in the indoor equipment, corrects the detected intensity, which is detected by a device that is located in the direction expressed by the direction information, to detection intensity, which is detected at a location in the specified direction that is separated from the indoor equipment by the same distance as the device;
a receiver that is mounted in the indoor equipment and that receives detected intensity information that expresses the detected intensity of the transmitted light or the electromagnetic waves detected by the device;
a detector that detects the direction from the indoor equipment to the device based on the plural directions that the light or electromagnetic waves are transmitted and the detected intensities of the light or electromagnetic waves transmitted in the plural directions respectively, detected by the device, and expressed by the received detected intensity information; and
a corrector that corrects the detected intensities that are expressed respectively by the received detected intensity information by using the correction factor that is expressed by information that is correlated with the information that expresses the detected direction; wherein
the detector detects the distance from the indoor equipment to the device based on the corrected detected intensity; further comprising a controller that controls the air-blowing state of the indoor equipment based on the detected direction and distance and the measured temperature or humidity.

11. The air-conditioning system according to claim 10, wherein
the detector calculates a composited vector a magnitude of which is determined based on the detected intensity by compositing plural vectors directions of which are the plural directions respectively, and detects a direction of the composited vector as the direction from the indoor equipment to the device.

12. The air-conditioning system according to claim 10, wherein
the device comprises:
an optical detector that detects light emitted from the transmitter mounted in the indoor equipment, and generates a voltage;
an amplifier that amplifies the voltage generated by the optical detector;
an adjuster that adjusts the amount that the amplifier amplifies the voltage; and
a transmitter transmits information that expresses the voltage that is amplified by the amplifier as detected intensity information that expresses the intensity of the light that was detected by the optical detector; wherein
the transmitter mounted in the indoor equipment, when the detected intensity that is expressed by the received detected intensity information is greater than a specified intensity, transmits a signal that requests that the amplifier perform adjustment so that the amount that the voltage to be amplified is lowered.

13. The air-conditioning system according to claim 10, wherein
the device comprises:
an optical detector that detects light emitted from the transmitter mounted in the indoor equipment, and generates a voltage;
an amplifier that amplifies the voltage generated by the optical detector;
an adjuster that adjusts the amount that the amplifier amplifies the voltage; and
a transmitter transmits information that expresses the voltage that was amplified by the amplifier as detected intensity information that expresses the intensity of the light that was detected by the optical detector; wherein
the transmitter mounted in the indoor equipment, when the detected intensity that is expressed by the received detected intensity information is less than a specified intensity, transmits a signal that requests that the amplifier perform adjustment so that the amount that the voltage to be amplified is raised.

14. An air-conditioning method, comprising:
a measurement step of a device measuring temperature or humidity;
a conversion step of converting a transmission direction of the light or electromagnetic waves from the transmitter mounted in the indoor equipment into plural directions;
a transmitting step of transmitting light or electromagnetic waves in plural converted directions;
a receiving step of receiving detected intensity information that expresses the detected intensity of the transmitted light or the electromagnetic waves detected by the device;
a detection step of detecting the distance from the indoor equipment to the device and the direction from the indoor equipment to the device based on the plural converted transmission directions and the detected intensities of the light or the electromagnetic waves transmitted in the plural directions respectively, detected by the device, and expressed by the received detected intensity information; and
a control step of controlling the air-blowing state of the indoor equipment based on the detected direction and distance and the measured temperature or humidity.

15. An air-conditioning method, comprising:
a measurement step of a device measuring temperature or humidity;
a transmitting step of transmitting in plural directions light or electromagnetic waves having directivity from indoor equipment to the device;
a receiving step of receiving detected intensity information that expresses the detected intensity of the transmitted light or the electromagnetic waves detected by the device;
a direction detection step of detecting the direction from the indoor equipment to the device based on the plural directions that the light or electromagnetic waves are transmitted and the detected intensities of the light or electromagnetic waves transmitted in the plural directions respectively, detected by the device, and expressed by the received detected intensity information;
a correction step of correcting the detected intensities that are expressed respectively by the received detected intensity information by using the correction factor that is expressed by information that is correlated with information that expresses the detected direction by a memory that correlates and stores direction information that expresses direction with reference to the indoor equipment and information that expresses a correction factor that, when light or electromagnetic waves are transmitted in a specified direction from the transmitter mounted in the indoor equipment, corrects the detected intensity, which is detected by a device that is located in the direction expressed by the direction information, to detection intensity, which is detected at a location in the specified direction that is separated from the indoor equipment by the same distance as the device;
a distance detection step of detecting the distance from the indoor equipment to the device based on the corrected detected intensity; and
a control step of controlling the air-blowing state of the indoor equipment based on the detected direction and distance and the measured temperature or humidity.

* * * * *